July 8, 1941.  J. K. HOLBROOK  2,248,627
PHOTOGRAPHIC APPARATUS
Filed July 15, 1938   3 Sheets-Sheet 1
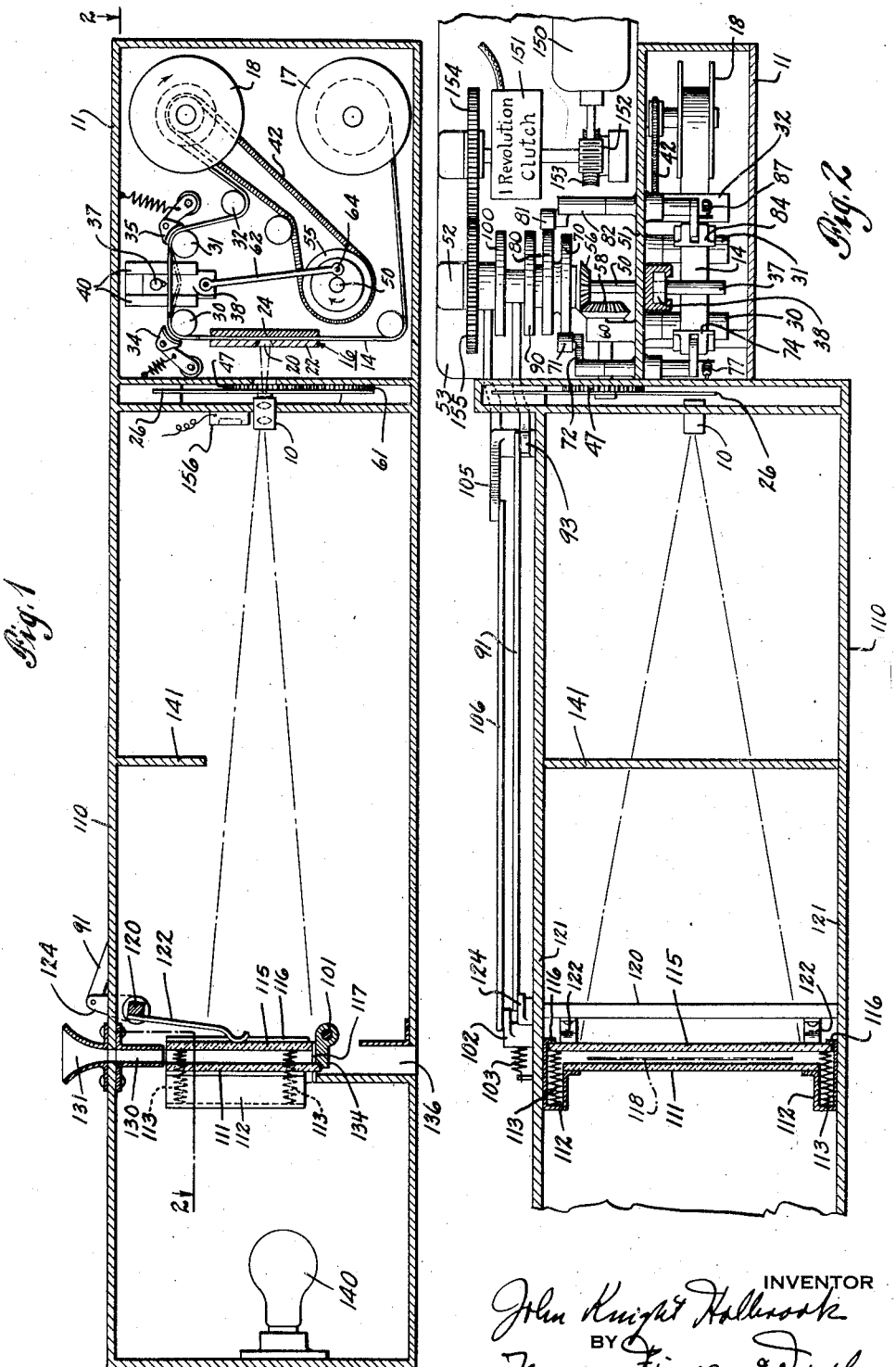
INVENTOR
John Knight Holbrook
BY
Morgan Finnegan & Durham
ATTORNEYS July 8, 1941.　　　　　J. K. HOLBROOK　　　　　2,248,627
PHOTOGRAPHIC APPARATUS
Filed July 15, 1938　　　　　3 Sheets-Sheet 2

INVENTOR
John Knight Holbrook
BY
　　ATTORNEYS

July 8, 1941.  J. K. HOLBROOK  2,248,627
PHOTOGRAPHIC APPARATUS
Filed July 15, 1938   3 Sheets-Sheet 3

INVENTOR
John Knight Holbrook
BY
Morgan Finnegan and Durham
ATTORNEYS

Patented July 8, 1941

2,248,627

UNITED STATES PATENT OFFICE 2,248,627

PHOTOGRAPHIC APPARATUS

John Knight Holbrook, New York, N. Y., assignor to Holbrook Microfilms, Inc., New York, N. Y., a corporation of New York Application July 15, 1938, Serial No. 219,306

1 Claim. (Cl. 88—24)

The present invention relates to a novel and improved photographic apparatus for automatically taking pictures of a series of documents in rapid succession.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings—

Figure 1 is a schematic vertical sectional view through the present illustrative embodiment of the invention;

Figure 2 is a fragmentary schematic horizontal sectional view of the apparatus shown in Figure 1;

Figure 3:
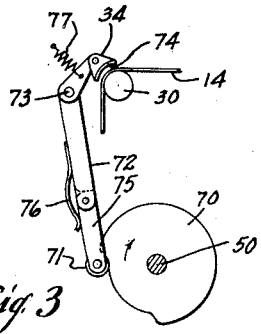
Figure 3 is a fragmentary detail showing one of the film gripping clutches and its actuating cam.
Figure 4:
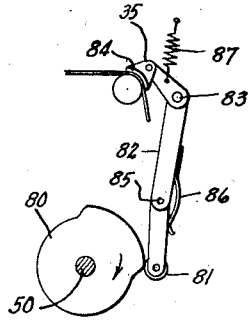
Figure 4 is a similar view of another film gripping clutch and its cam.
Figure 5:
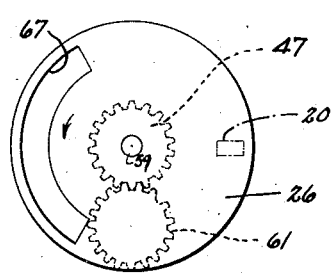
Figure 5 is a fragmentary detailed view of the camera shutter.
Figure 6:
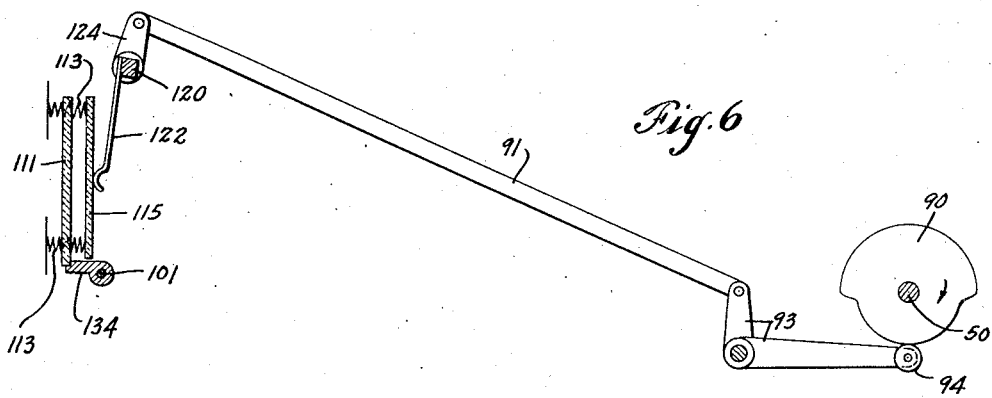
Figure 6 is a fragmentary detailed view of the copy receiving frame and its actuating members.
Figure 7:
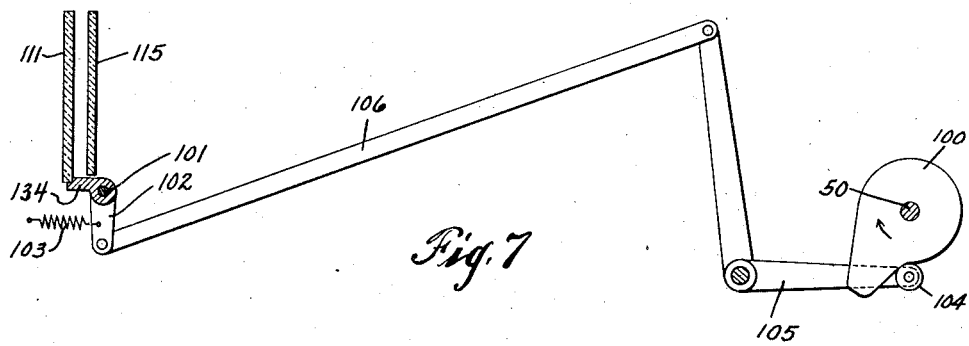
Figure 7 is a fragmentary detailed view of the copy holding detent and its actuating members, and Figures 3 to 7 all show the parts in the same phase of their cycle of operation.

The present invention has for its object the provision of a novel and improved micro-camera apparatus for photographing bank checks and other small documents in rapid succession on strip film. A further object is the provision of an improved apparatus for photographing a single image showing both the face and back of a check. Still another object is the provision of a photographic apparatus in which, automatically upon the insertion of a check in its proper position, the film is exposed and fed automatically to its next exposure position after which the document is released from exposure position. The invention also provides an improved apparatus in which imperforate roll film, such as 16 mm. motion picture film, is used for the photographic record and the check or other copy is flattened at the time of exposure, so that the film is used to best advantage to secure the best image due to the wider exposure area available and the holding of the check in a single plane.

In accordance with the illustrative embodiment of the invention, the check or other small document is photographed on 8 or 16 mm. imperforate motion picture film, the check image extending transversely of the film so that a very large number of complete records may be made in a given length of film, and in many cases over 150 checks may be copied complete on one foot of 16 mm. film, or 300 on one foot of 8 mm. film. The check is received in a vertical slot formed between two pieces of glass one of which is fixed while the other is movable toward and from it to press the check flat and when so pressed the check is in proper exposure position, parallel to the film in the focal plane of camera and at the proper distance from the lens. A lamp is provided to illuminate the check by transmitted light while being photographed and is positioned beyond the check and preferably out of line with the lens axis so that different sizes of checks may be photographed without causing lens "ghosts" and without losing contrast and definition in the image. Means are also provided for automatically controlling the exposure and feeding of the film and preferably comprise a photoelectric cell which is responsive to the diminution in light caused by the presence of a check in exposure position, and these means also actuate the check flattening and releasing means so that the entire recording operation takes place automatically upon the insertion of a check into exposure position.

Referring now in detail to the illustrative embodiment as shown in the accompanying drawings, there is provided an intermittently operating camera adapted to operate on imperforate motion picture film. This camera conveniently may be substantially that of my copending application Serial Number 194,026, filed March 5, 1938. As embodied the camera comprises a lens 10 mounted at the front of the casing 11 and adapted to project the image onto the film 14 which is fed through the film gate 16 from spool 17 onto spool 18. An image aperture 20 is provided at the focal plane in plate 22 so as to limit the image to the desired size and the film is held in the focal plane by means of the presser plate 24. A rotary shutter 26 exposes the film 14 as the shutter opens during its intermittent rotation.

The shutter and film feed are properly synchronized so that the film is fed while the shutter is closed. The film 14, after exposure, passes over the guide rollers 30, 31, 32, and film gripping means are provided cooperating with guide rollers 30 and 31. The film feeding means includes the alternatively operated film gripping means 34 and 35 which press the film against the rollers 30 and 31 and hold it against movement. Between the rollers 30 and 31 is a looping mechanism including the reciprocable pin 37 mounted on plate 38 which is slidable in guides 40. As pin 37 is moved downwardly, gripping means 35 is engaged and gripping means 34 is released so that film is drawn past the aperture 20 from spool 17. Then gripping means 34 is engaged and 35 is released as the pin 37 moves upwardly and spool 18 takes up the film through the tension exerted by its spring drive 42. While gripping means 34 is engaged and the film 14 is held stationary at the gate 16, the shutter 26 rotates to exposure position exposing the film to the lens image.

The shutter 26, and film feeding means are all operated from the main shaft 50. Shaft 50 is journalled in the side wall 51 of the camera and is externally supported in bracket 52 mounted on the base plate 53. Within the camera, shaft 50 carries a pulley 55 over which spring belt 42 runs to drive the take-up spool 18, and outside of the casing 11, shaft 50 carries a mitre-gear 56 meshing with gear 58 which drives gear 61 meshing with a gear 47. Gear 58 is mounted on the shutter shaft 59 and is journalled in bracket 60. Pin 37 is reciprocated by means of the pitman 62 actuated by crank pin 64 on pulley 55 so that the pin 37 and shutter 26 make one complete cycle each revolution of the pulley 55.

The film gripping means 34 is actuated from cam 70 by means of cam roller 71 mounted at the lower end of bell crank 72. Bell crank 72 is pivoted on pivot 73 and carries at its upper end the pivoted concave gripping member 74 to clamp the film 14 against the roller 30. The lower arm 75 of the bell crank is broken but held straight by leaf spring 76 so as to allow tight engagement with the film and is retracted by means of tension spring 77.

The film gripping means 35 is actuated by cam 80 on shaft 50 by similar means comprising the cam roller 81 which is rotatably supported at the lower end of bell crank 82, and bell crank 82 is pivotally mounted on pin 83 and carries at its upper end the film engaging member 84 having a concave face to grip the film as it passes over roller 31. The lower arm of the bell crank 82 is pivotally broken at 85 and is normally held in its straight position by means of the leaf spring 86. These gripping means are applied by the action of the cam 80, and the member 84 is moved out of engagement with the film by tension spring 87.

In front of the camera, and forming a forward extension thereof, is a rectangular casing 110 which encloses the check receiving and positioning means, as well as the lights for illuminating the check. Forwardly of the casing 110 there is supported the check-receiving and positioning means which holds the check in exposure position while it is being photographed. These means comprise a glass plate 111 held in a fixed position parallel to the film 14 at the exposure area 20, and substantially symmetrically disposed with reference to the optical axis of the lens 10, this plate being positioned at the proper distance from the lens 10 so that a sharp image is formed upon the film 14. At each side of the plate 111 are spring cages 112 mounted on the side walls of the casing 110 and retaining compression springs 113 which bear against the edges of the transparent glass plate 115. Plate 115 is limited in its movement by the edges 116 of the spring cages, while the bottom of the plate 115 rests against the narrow ledges 117. Plate 111 may be made of opal glass, but is preferably made of transparent plate glass.

Means are provided for bodily movement of glass plate 115 toward and from the plate 111 so as to firmly grip the check 118 in exposure position and flatten out any folds or creases in it, thereby placing it in a single plane and improving the sharpness of the photographic image. For this purpose, a shaft 120 is journalled in the side walls 121 of the casing 110, and carries the spring fingers 122 which bear against the camera side of the plate 115 near its side edges. An arm 124 is connected to shaft 120 and these parts are oscillated as the cam 90 is rotated by shaft 50. Arm 122 is pivotally connected to link 91 and the other end of link 91 is pivotally connected to the bell crank 93 carrying a cam follower 94 which bears against the surface of the cam 90.

A narrow horizontally disposed slot 130 having a flared mouth 131 is provided and extends across the top of the casing 110, the slot being sufficiently wide to accommodate the full width of the check, and the checks to be photographed may be dropped one at a time through this slot. When so dropped, a check falls between the plates 111 and 115 and is held in this position by means of the pivoted stop 134 until after the exposure has been completed. Stop 134 is mounted on shaft 101 and is connected to arm 102 which is held in stopping position by means of the tension spring 103, and is retracted to allow the check to drop by means of the cam 100 acting through cam follower 104 mounted on one end of pivoted bell crank 105 while the other end of the bell crank is connected to arm 102 by link 106. After each check is released by stop 134, it drops from the machine through slot 136 into any suitable receptacle.

For illuminating the checks while in exposure position, a lamp 140 is provided on the side of the check away from the camera and preferably within the casing 110. This lamp is preferably positioned below the optical axis of the lens 10 so that the light passing through the plates 111 and 115 around the upper portion of the checks is shielded from the lens 10 and does not shine directly into the lens, thereby avoiding the necessity of separately masking the plates 111 and 115 for different sizes of checks. For the same purpose, a blind 141 is provided between the check and the lens, extending downwardly from the upper wall of the casing 110 almost to the imaginary plane connecting the upper edge of the check and exposure position with the lens.

For rotating the shaft 50 so as to feed the film, press the check flat, expose it and release it through the slot 136, motor means are provided and comprises a constantly rotating motor 150 driving the worm 152 meshing with worm gear 153 which drives pinion 154 through the one revolution clutch and meshes with gear 155 fixed to the shaft 50. These parts are timed with the angle of the shutter opening 67 so as to produce the correct exposure of the film 14 taking into consideration the intensity of the light from lamp 140, and Figures 3 to 7 show the parts in their respective positions at the beginning of the film feeding operation.

While the foregoing apparatus may be utilized without automatic control of its various operations, such automatic means are preferably provided so that the film feeding exposing and check-releasing operations are carried out in proper succession automatically upon the insertion of a check between the plates 111 and 115. As embodied, photo-electric means are provided for automatically initiating the camera operation and these means preferably cause the one revolution clutch to be engaged when the light transmitted through plates 111 and 115 is diminished by the presence of a check. Photo-electric cell 156 is positioned adjacent the lens 10 along the front of the camera casing so that light from the lamp 140 falls upon it with sufficient intensity to keep the one revolution clutch from being engaged except when a check 118 is in exposure position between the plates 111 and 115.

Figures 8, 9:
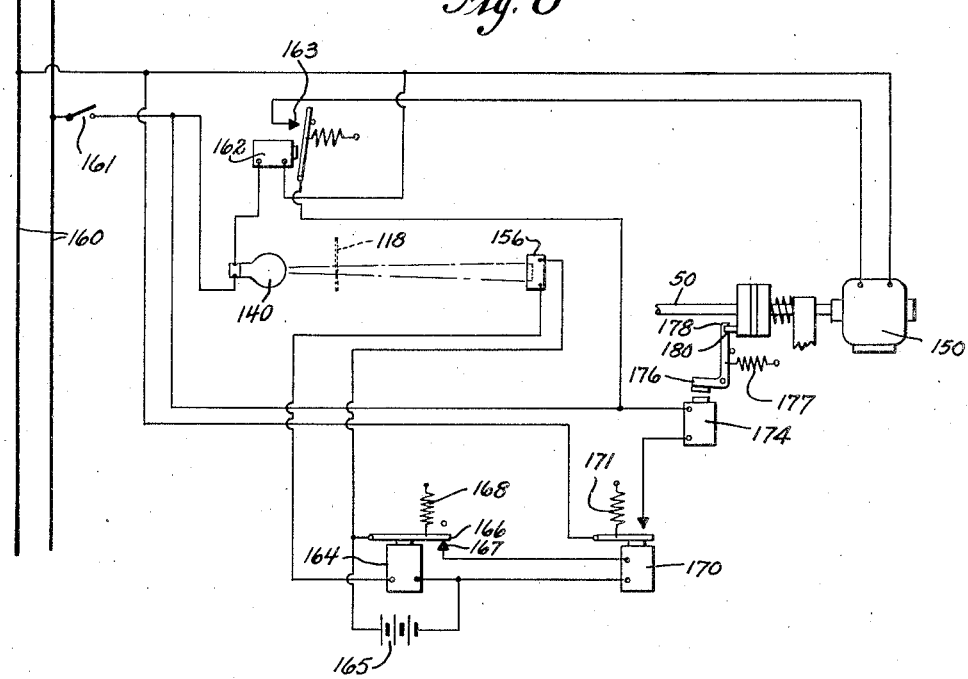
Figure 8 is a circuit diagram for the electrical parts of the apparatus.
Figure 9 is an enlarged view of an image obtained by use of the present apparatus.

Figure 8 shows a circuit diagram of the electrical connection of the apparatus. Lamp 140 is supplied with power from the mains 160 through the master switch 161 and the windings of relay 162, while the motor 150 is supplied with power from the mains 160 through the master switch 161 and the armature contacts 163 of the normally open relay 162. When the lamp is lit the motor is running, but in case the lamp burns out the motor is automatically stopped. The light from lamp 140 normally shines upon the photo-cell 156 which is in series with the winding of the sensitive relay 164 supplied with power from the battery 165, and the reduction in resistance of the cell 156 causes the armature 166 to be held against contact 167 against the action of spring 168, thereby supplying power from the battery 165 to the windings of the relay 170 so as to hold this armature in open circuit position against the tension of spring 171, thereby interrupting the supply of current from the mains 160 to electromagnet 174. When a check 118 is in exposure position, the intensity of light falling on the photo-cell 156 is sufficiently reduced so that the armature 166 moves to open circuit position, allowing the armature relay 170 to close the circuit supplying electromagnet 174 with power, and when the power is so supplied, armature 176 is attracted against the tension of spring 177 so as to move the stop 178 out of its latching position with reference to pin 180.

Thereupon, the motor 150 is coupled to the shaft 50, causing the shaft 50 to make one complete revolution, during which the film is fed, the check is pressed flat, the film is exposed, and the check is released after which the shaft 50 is held against further movement by the action of stop 178 on pin 180. The mechanism is then ready for the deposit of the next check, at which time it will repeat its cycle of operation.

Figure 9 of the drawings shows the positive of a greatly enlarged image as recorded on the film 14, showing both the obverse and reverse of the check in superposed relation. With such an image, the obverse is easily read in the position shown, and the reverse is easily read either by viewing the film from the other side or by making a reversed print of the film.

The invention in its broader aspects is not limited to the specific mechanisms shown and described but departures may be made therefrom within the scope of the accompanying claim without departing from the principles of the invention and without sacrificing its chief advantages.

What I claim is:

Photographic apparatus including a camera having film feeding means, a lens and a shutter, a lamp in front of the lens, and means for vertically supporting a translucent sheet to be copied between the lamp and lens in exposure position, means for smoothing the sheet, said lamp being positioned out of line with the lens axis whereby sheets of different size may be copied without the light passing around the edges of the sheet being directed away from the lens, and means for sequentially operating the film feeding means, shutter and sheet supporting and smoothing means.

JOHN KNIGHT HOLBROOK.